United States Patent
Kim et al.

(10) Patent No.: US 10,250,302 B2
(45) Date of Patent: Apr. 2, 2019

(54) METHOD FOR TRANSMITTING REFERENCE SIGNAL FOR CHANNEL MEASUREMENT IN MULTI-ANTENNA WIRELESS COMMUNICATION SYSTEM, AND APPARATUS THEREFOR

(71) Applicant: LG ELECTRONICS INC., Seoul (KR)

(72) Inventors: Youngtae Kim, Seoul (KR); Kijun Kim, Seoul (KR); Hyungtae Kim, Seoul (KR); Jonghyun Park, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 15/510,844

(22) PCT Filed: Sep. 18, 2015

(86) PCT No.: PCT/KR2015/009821
§ 371 (c)(1),
(2) Date: Mar. 13, 2017

(87) PCT Pub. No.: WO2016/043549
PCT Pub. Date: Mar. 24, 2016

(65) Prior Publication Data
US 2017/0279502 A1 Sep. 28, 2017

Related U.S. Application Data

(60) Provisional application No. 62/051,956, filed on Sep. 18, 2014.

(51) Int. Cl.
*H04B 7/0413* (2017.01)
*H04B 7/06* (2006.01)
(Continued)

(52) U.S. Cl.
CPC ......... *H04B 7/0413* (2013.01); *H04B 7/0478* (2013.01); *H04B 7/0617* (2013.01);
(Continued)

(58) Field of Classification Search
None
See application file for complete search history.

(56) References Cited

U.S. PATENT DOCUMENTS

| | | | |
|---|---|---|---|
| 2013/0279437 A1 | 10/2013 | Ng et al. | |
| 2014/0098689 A1* | 4/2014 | Lee | H04B 7/0469 370/252 |
| 2014/0192734 A1* | 7/2014 | Ng | H04L 5/0035 370/329 |

FOREIGN PATENT DOCUMENTS

| WO | WO 2014/052806 A1 | 4/2014 |
|---|---|---|
| WO | WO 2014/137203 A2 | 9/2014 |

OTHER PUBLICATIONS

Huawei et al., "Discussion on CSI Feedback for ePDCCH," 3GPP TSG RAN WG1 Meeting #69, R1-121967, Prague, Czech Republic, May 21-25, 2012 (May 12, 2012), 3 pages.
(Continued)

*Primary Examiner* — Alex Skripnikov
(74) *Attorney, Agent, or Firm* — Birch, Stewart, Kolasch & Birch, LLP

(57) ABSTRACT

The present invention relates to a method and an apparatus for transmitting, by a base station, a reference signal in a wireless communication system supporting a multi-antenna consisting of a plurality of horizontal domain antennas and a plurality of vertical domain antennas. Specifically, the method comprises the steps of: configuring, as a cell-specific reference signal (CRS) port, M first antenna ports among a total of N antennas that the base station has (where N and M are positive integers, N>M); transmitting a CRS using the M first antenna ports and transmitting a demodulation reference
(Continued)

signal (DM-RS) using O second antenna ports (where O is a positive integer, N>O), to a terminal; and receiving channel measurement information using the CRS and the DM-RS which is fed back from the terminal.

6 Claims, 6 Drawing Sheets

(51) Int. Cl.
*H04L 5/00* (2006.01)
*H04L 27/26* (2006.01)
*H04W 72/04* (2009.01)
*H04B 7/0456* (2017.01)

(52) U.S. Cl.
CPC ......... *H04B 7/0626* (2013.01); *H04B 7/0691* (2013.01); *H04L 5/005* (2013.01); *H04L 5/0023* (2013.01); *H04L 5/0048* (2013.01); *H04L 5/0051* (2013.01); *H04L 5/0091* (2013.01); *H04L 27/2613* (2013.01); *H04W 72/046* (2013.01); *H04B 7/0469* (2013.01)

(56) References Cited

OTHER PUBLICATIONS

Nokia Siemens Networks et al., "Downlink Control Signaling and Transmission Mode Design for CoMP,"3GPP TSG-RAN WG1 Meeting #69, R1-122415, May 21-25, 2012 (May 12, 2012), 3 pages.

ZTE, "Consideration on 3D Channel Model and Evaluation Methodology," 3GPP TSG RAN WG1 Meeting #72, R1-130693, St Julian's, Malta, Jan. 28-Feb. 1, 2013, 5 pages.

* cited by examiner (a)

(b)

(a)

(b)

(a)

(b)

(c)

METHOD FOR TRANSMITTING REFERENCE SIGNAL FOR CHANNEL MEASUREMENT IN MULTI-ANTENNA WIRELESS COMMUNICATION SYSTEM, AND APPARATUS THEREFOR

CROSS REFERENCE TO RELATED APPLICATIONS

This application is the National Phase of PCT International Application No. PCT/KR2015/009821, filed on Sep. 18, 2015, which claims priority under 35 U.S.C. 119(e) to U.S. Provisional Application No. 62/051,956, filed on Sep. 18, 2014, all of which are hereby expressly incorporated by reference into the present application.

TECHNICAL FIELD

The present invention relates to a wireless communication system, and more particularly, to a method for transmitting a reference signal for channel measurement in a multi-antenna wireless communication system and apparatus therefor.

BACKGROUND ART

MIMO (multiple input multiple output) refers to a method for improving transmission/reception data efficiency using a plurality of transmit (Tx) antenna and a plurality of receive (Rx) antennas instead of a single Tx antenna and a single Rx antenna. That is, MIMO is a scheme in which a transmitting end or a receiving end of a wireless communication system improves capacity or enhances performance using multiple antennas. MIMO may be referred to as multi-antenna technology.

To support multi-antenna transmission, a precoding matrix for appropriately distributing transmission information to antenna s according to channel state can be applied. 3GPP LTE (3$^{rd}$ Generation Partnership Project Long Term Evolution) supports a maximum of 4 Tx antennas for downlink transmission and defines a precoding codebook for downlink transmission using the Tx antennas.

In a MIMO based cellular communication environment, data transfer rate can be improved through beamforming between a transmitting end and a receiving end. Whether beamforming is applied is determined based on channel information, a channel estimated through a reference signal at the receiving end is appropriately quantized using a codebook and fed back to the transmitting end.

A description will be given of a spatial channel matrix (or channel matrix) which can be used to generate a codebook. The spatial channel matrix (or channel matrix) can be represented as follows.

$$H(i,k) = \begin{bmatrix} h_{1,1}(i,k) & h_{1,2}(i,k) & \cdots & h_{1,Nt}(i,k) \\ h_{2,1}(i,k) & h_{2,2}(i,k) & \cdots & h_{2,Nt}(i,k) \\ \vdots & \vdots & \ddots & \vdots \\ h_{Nr,1}(i,k) & h_{Nr,2}(i,k) & \cdots & h_{Nr,Nt}(i,k) \end{bmatrix}$$

Here, H(i,k) represents a spatial channel matrix, $N_r$ denotes the number of Rx antennas, $N_t$ denotes the number of Tx antennas, r is an Rx antenna index, t is a Tx antenna index, i represents an OFDM (or SC-FDMA) symbol index and k represents a subcarrier index.

$h_{r,t}(i,k)$ is an element of the channel matrix H(i,k) and represents an r-th channel state and a t-th antenna corresponding to an i-th symbol and k-th subcarrier.

In addition, a spatial channel covariance matrix which can be used in the present invention will now be briefly described. The spatial channel covariance matrix can be represented by R.

$$R = E[H_{i,k}^H H_{i,k}]$$

where H denotes a spatial channel matrix and R denotes a spatial channel covariance matrix. In addition, E[ ] represents the mean, i represents a symbol index and k represents a frequency index.

Singular value decomposition (SVD) is a method for decomposing a rectangular matrix, which is widely used in signal processing and statistics. SVD is to normalize matrix spectrum theory for an arbitrary rectangular matrix. An orthogonal square matrix can be decomposed into diagonal matrices using an Eigen value as a basis using spectrum theory. When it is assumed that the channel matrix H is an mxn matrix composed of a plurality of set elements, the matrix H can be represented as a product of three matrices as follows.

$$H_{m \times n} = U_{m \times n} \Sigma_{m \times n} V_{n \times n}^H$$

Here, U and V represent unitary matrices and $\Sigma$ denotes an mxn matrix including a non-zero singular value. The singular value is $\Sigma = diag(\sigma_1 \ldots \sigma_r), \sigma_i = \sqrt{\lambda_i}$. Representation as a product of three matrices is referred to as SVD. SVD can handle normal matrices, compared to Eigen value decomposition which can decompose only orthogonal square matrices. SVD and Eigen value composition are related to each other.

When the matrix H is a positive definite Hermitian matrix, all Eigen values of H are non-negative real numbers. Here, singular values and singular vectors of H are equal to Eigen values and Eigen vectors of H. Eigen value decomposition (EVD) can be represented as follows (here, Eigen values may be $\lambda_1, \ldots, \lambda_r$).

$$HH^H = (U\Sigma V^H)(U\Sigma V^H)^H = U\Sigma \Sigma^T U^H$$

$$H^H H = (U\Sigma V^H)^H (U\Sigma V^H) = V\Sigma^T \Sigma V$$

Here, Eigen values can be $\lambda_1, \ldots, \lambda_r$. Information on U between U and V, which indicate channel directions, can be known through singular value decomposition of $HH^H$ and information on V can be known through singular value decomposition of $H^H H$. In general, a transmitting end and a receiving end respectively perform beamforming in order to achieve higher throughput in multi-user MIMO (MU-MIMO). When a receiving end beam and a transmitting end beam are represented by matrices T and W, a channel to which beamforming is applied is indicated by THW=TU($\Sigma$) VW. Accordingly, it is desirable to generate the receiving end beam on the basis of U and to generate the transmitting end beam on the basis of V in order to accomplish higher throughput.

In design of a codebook, it is necessary to reduce feedback overhead using as few bits as possible and to correctly quantize a channel to obtain a sufficient beamforming gain. One of codebook design schemes presented or adopted as a standard by recent mobile communication systems, such as 3GPP LTE (3rd Generation Partnership Project Long Term Evolution), LTE-Advanced and IEEE 16m, is to transform a codebook using a long-term covariance matrix of a channel, as represented by Equation 1.

$$W' = \text{norm}(RW) \quad \text{[Equation 1]}$$

Here, W denotes an existing codebook generated to reflect short-term channel information, R denotes a long-term covariance matrix of channel matrix H, norm(A) represents a matrix in which norm is normalized into 1 per column of matrix A, and W' represents a final codebook generated by transforming the codebook W using the channel matrix H, the long-term covariance matrix R of the channel matrix H and a norm function.

The long-term covariance matrix R of the channel matrix H can be represented as Equation 2.

$$R = E[H^H H] = V\Lambda V^H = \sum_{i=1}^{Nt} \sigma_i, v_i v_i^H \quad \text{[Equation 2]}$$

Here, the long-term covariance matrix R of the channel matrix H is decomposed into $V\Lambda V^H$ according to singular value decomposition. V is an Nt×Nt unitary matrix having $V_i$ as an i-th column vector, $\Lambda$ is a diagonal matrix having $\sigma_i$ as an i-th diagonal component and $V^H$ is a Hermitian matrix of V. In addition, $\sigma_i$ and $V_i$ respectively denote an i-th singular value and an i-th singular column vector corresponding thereto ($\sigma_1 \geq \sigma_2 \geq \ldots \geq \sigma_{Nt}$).

DISCLOSURE OF THE INVENTION

Technical Task

The technical task of the present invention is to provide a method for transmitting a reference signal for channel measurement in a multi-antenna wireless communication system and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In a first aspect of the present invention, provided herein is a method for transmitting a reference signal by an evolved node B (eNB) in a wireless communication system supporting multiple antennas composed of a plurality of horizontal domain antennas and a plurality of vertical domain antenna, including: setting M first antenna ports among a total of N antennas in the eNB as cell-specific reference signal (CRS) ports (where N and M are positive integers and N>M); transmitting CRSs to a user equipment (UE) using the M first antenna ports and transmitting demodulation reference signals (DM-RSs) to the UE using O second antenna ports (where O is a positive integer and N>O); and receiving, from the UE, feedback on channel measurement information obtained based on the CRSs and the DM-RSs.

Preferably, the first antenna ports may be selected from among $N_H$ horizontal domain antenna ports and the second antenna ports may be composed of at least one horizontal antenna port except the M first antenna ports among the $N_H$ horizontal domain antenna ports and $N_V$ vertical antenna domain ports.

Preferably, the method may further include transmitting information on the first antenna ports and information on the second antenna ports to the UE through higher layer signaling.

Preferably, the N antennas may be grouped into O groups and the groups may be mapped to the O antenna ports, respectively. More preferably, precoding may be applied to each of the O groups in a unit of a resource block. Further preferably, the precoding may be applied based on the channel measurement information received from the UE.

Preferably, the method may further include transmitting information on the number of the second antenna ports and information on the number of layers to the UE.

Preferably, the method may further include transmitting information on a power ratio of the DM-RSs to a physical downlink shared channel (PDSCH).

Preferably, the method may further include indicating channel state information reference signals (CSI-RSs) interconnected to the DM-RSs.

In a second aspect of the present invention, provided herein is a method for receiving a reference signal by a user equipment (UE) in a wireless communication system supporting multiple antennas composed of a plurality of horizontal domain antennas and a plurality of vertical domain antenna, including: receiving information on M first antenna ports set as cell-specific reference signal (CRS) ports among a total of N antennas in an evolved node B (eNB) (where N and M are positive integers and N>M); receiving CRSs from the eNB through the M first antenna ports and receiving demodulation reference signals (DM-RSs) from the eNB through O second antenna ports (where O is a positive integer and N>O); and transmitting, to the eNB, feedback on channel measurement information obtained based on the CRSs and the DM-RSs.

In a third aspect of the present invention, provided herein is an evolved node B (eNB) for transmitting a reference signal in a wireless communication system supporting multiple antennas composed of a plurality of horizontal domain antennas and a plurality of vertical domain antenna, including a radio frequency unit and a processor. In this case, the processor may be configured to: set M first antenna ports among a total of N antennas in the eNB as cell-specific reference signal (CRS) ports (where N and M are positive integers and N>M); transmit CRSs to a user equipment (UE) using the M first antenna ports and transmit demodulation reference signals (DM-RSs) to the UE using O second antenna ports (where O is a positive integer and N>O); and receive, from the UE, feedback on channel measurement information obtained based on the CRSs and the DM-RSs.

In a fourth aspect of the present invention, provided herein is a user equipment (UE) for receiving a reference signal in a wireless communication system supporting multiple antennas composed of a plurality of horizontal domain antennas and a plurality of vertical domain antenna, including a radio frequency unit and a processor. In this case, the processor may be configured to: receive information on M first antenna ports set as cell-specific reference signal (CRS) ports among a total of N antennas in an evolved node B (eNB) (where N and M are positive integers and N>M); receive CRSs from the eNB through the M first antenna ports and receive demodulation reference signals (DM-RSs) from the eNB through O second antenna ports (where O is a positive integer and N>O); and transmit, to the eNB, feedback on channel measurement information obtained based on the CRSs and the DM-RSs.

Advantageous Effects

According to embodiments of the present invention, a method for transmitting a reference signal for channel measurement in a multi-antenna wireless communication system and apparatus therefor can be provided.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE mobile communication systems are used. However, the description is applicable to any other mobile communication system except for specific features inherent to the 3GPP LTE systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term "base station (BS)" is assumed to refer to any node of a network end, such as a Node B, eNode B, an access point (AP), etc., communicating with a UE. While the following description is based on 3GPP LTE and LTE-A, the present invention is applicable to other communication systems.

In a mobile communication system, a UE may receive information from a BS on downlink and transmit information to the BS on uplink. The information that the UE transmits or receives includes data and various types of control information. There are many physical channels according to the types and usages of information that the UE transmits or receives.

A description will be given of 3GPP LTE ($3^{rd}$ Generation Partnership Project Long Term Evolution) (referred to as LTE hereinafter) and LTE-Advanced (referred to as LTE-A hereinafter) systems as exemplary mobile communication systems to which the present invention is applicable.

Figure 1:
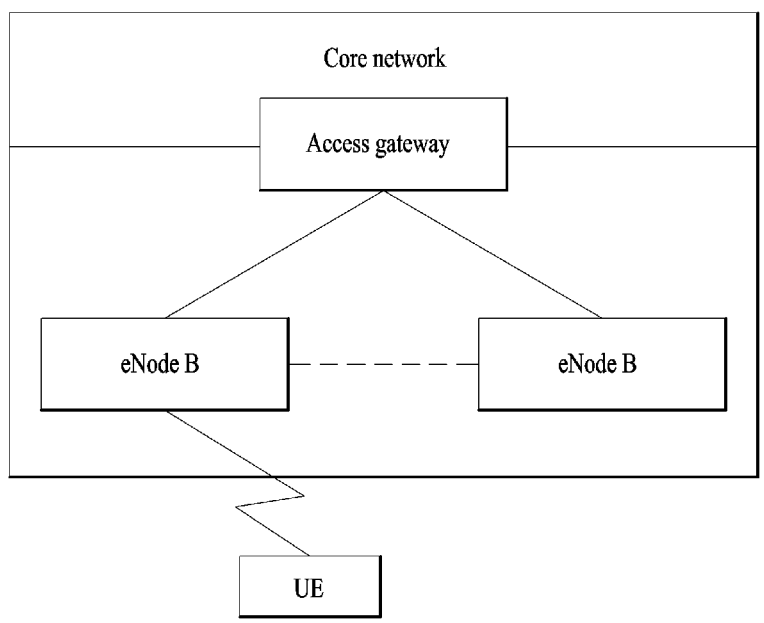
FIG. 1 is a schematic diagram illustrating an E-UMTS network structure as an example of a mobile communication system.

FIG. 1 illustrates E-UMTS (Evolved Universal Mobile Telecommunicaiton System) network architecture as an exemplary mobile communication system.

E-UMTS, which evolves from UMTS (Universal Mobile Telecommunication System), is under standardization according to 3GPP. E-UMTS may be regarded as an LTE system. Technical specification of UMTS and E-UMTS refers to Release 7 and Release 8 of "$3^{rd}$ Generation Partnership Project: Technical Specification Group Radio Access Network".

Referring to FIG. 1, E-UMTS includes a user equipment (UE), an eNB and an access gateway (AG) located at the end of a network (E-UTRAN) and connected to an external network. The eNB can simultaneously transmit multiple data streams for broadcast service, multicast service and/or unicast service.

One or more cells are present in one eNB. A cell is set to one of bandwidths of 1.25, 2.5, 5, 10, 15 and 20 MHz and provides downlink or uplink transmission service to multiple UEs. Different cells may be configured to provide different bandwidths. The eNB controls data transmission/reception with respect to a plurality of UEs. The eNB transmits downlink scheduling information about downlink data to a corresponding UE to inform the UE of a time/frequency region used to transmit the data, coding information, data size, hybrid automatic repeat and request (HARQ) related information, etc.

In addition, the eNB transmits uplink scheduling information about uplink data to a corresponding UE to notify the UE of a time/frequency region that can be used by the UE, coding information, data size, HARQ related information, etc. An interface for user traffic or control traffic transmission may be used between eNBs. A core network (CN) may be composed of the AG and a network node for user registration of the UE. The AG manages UE mobility per TA (tracking area) including a plurality of cells.

While wireless communication technology has been developed to LTE on the basis of wideband code division multiple access (WCDMA), demands and expectations of users and carriers steadily increase. Furthermore, technical evolution in wireless communication technology is required to have competitiveness since other wireless access techniques are being developed. That is, decrease in cost per bit, service availability increase, use of flexible frequency band, simple architecture and open interface, adequate power consumption of UEs, etc. are needed.

Recently, 3GPP has standardized technology subsequent to LTE. This is referred to as "LTE-A" in the specification. A main difference between LTE and LTE-A is a system bandwidth different and introduction of a relay. LTE-A aims to support a wideband of up to 100 MHz. To achieve this, LTE-A employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in LTE. Each frequency block is transmitted using a component carrier.

Figure 2:
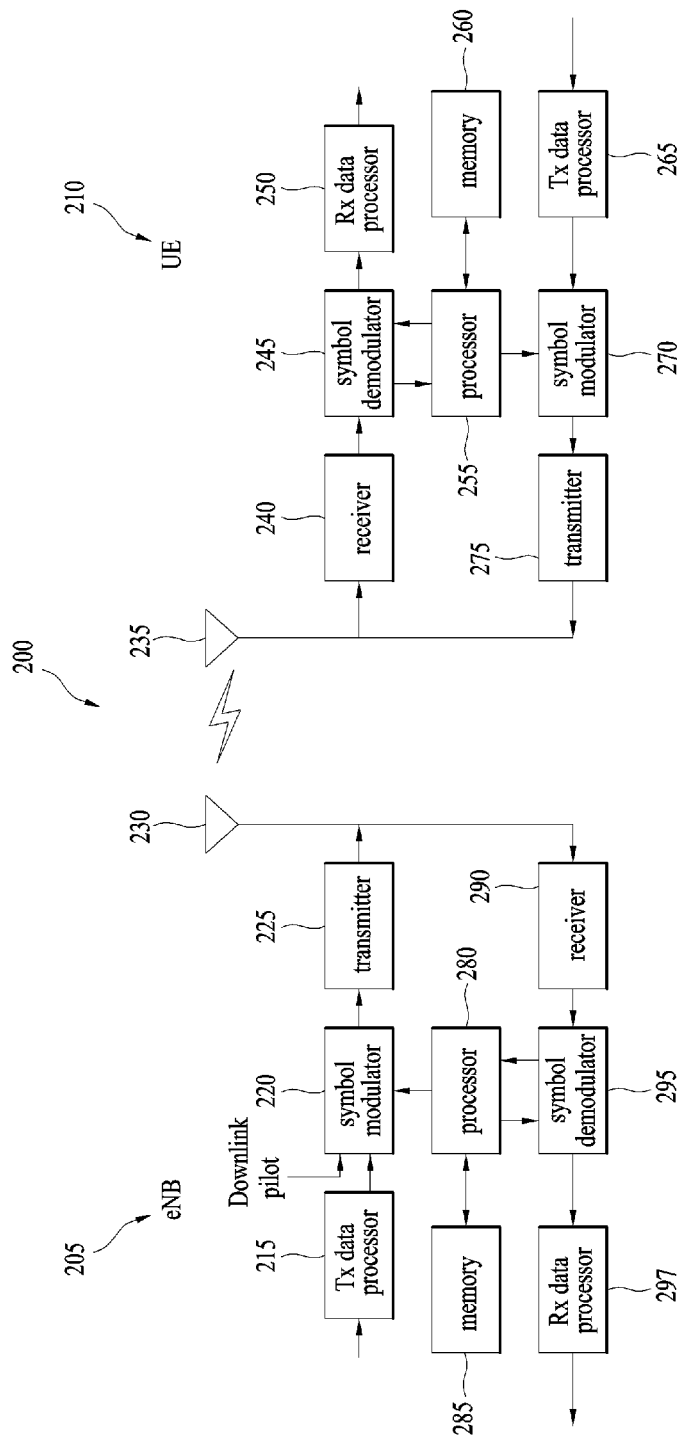
FIG. 2 is a block diagram illustrating configurations of an evolved node B (eNB) and a user equipment (UE) of a wireless communication system according to the present invention.

FIG. 2 is a block diagram illustrating configurations of an eNB 105 and a UE 110 in a wireless communication system 100.

While one eNB 105 and one UE 110 are shown in FIG. 2 to simplify the configuration of the wireless communication system 100, the wireless communication system 100 may obviously include one or more eNBs and/or one or more UEs.

Referring to FIG. 2, the eNB 105 may include a transmission (Tx) data processor 115, a symbol modulator 120, a transmitter 125, a Tx/Rx antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the eNB 105 and the UE 110, the eNB 105 and the UE 110 include multiple antennas. Hence, the eNB 105 and the UE 110 support MIMO (Multiple Input Multiple Output). Furthermore, the eNB 105 may support both single user-MIMO (SU-MIMO) and multi-user-MIMO (MU-MIMO) in the present invention.

On the downlink, the Tx data processor 115 receives traffic data, processes the received traffic data through formatting, coding, interleaving, and modulation (or symbol mapping), and thus outputs modulated symbols ("data symbols"). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the eNB 105 through the antenna 135 and provides the received downlink signal to the receiver 140. The receiver 140 processes the downlink signal, for example, through filtering, amplification and frequency downconversion and converts the processed downlink signal into digital samples. The symbol demodulator 145 demodulates received pilot symbols and outputs the demodulated pilot symbols to the processor 155 for use in channel estimation.

The symbol demodulator 145 receives a frequency response estimate with respect to downlink from the processor 155, acquires data symbol estimates (i.e. estimates of the transmitted data symbols) by demodulating the received data symbols using the frequency response estimate and provides the data symbol estimates to the Rx data processor 150. The Rx data processor 150 demodulates the data symbol estimates (i.e. performs symbol demapping), deinterleaves the demodulated data symbols, and decodes the deinterleaved data symbols, thereby recovering the traffic data transmitted by the eNB 105.

The operations of the symbol demodulator 145 and the Rx data processor 150 are complementary to the operations of the symbol modulator 120 and the Tx data processor 115 of the eNB 105.

On the uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the eNB 105 through the antenna 135.

The eNB 105 receives the uplink signal from the UE 110 through the antenna 130. In eNB BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the eNB 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 155 and 180. When the embodiments of the present invention are implemented using firmware or software, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/BS and a network may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/eNB and the network exchange RRC messages through the RRC layer.

The term eNB used in the present invention can refer to a "cell or sector" when used as a regional concept. A serving eNB (or serving cell) can be regarded as an eNB which provides main services to UEs and can transmit and receive control information at a coordinated multiple transmission point. In this sense, the serving eNB (or serving cell) can be referred to as an anchor eNB (or anchor cell). Similarly, a neighbor eNB can be referred to as a neighbor cell.

Multiple Input Multiple Output (MIMO) System

According to the MIMO technology, entire data can be received by combining a plurality of pieces of data received through a plurality of antennas instead of using a single antenna path to receive a whole message. Since the MIMO technology may enhance data transmission rate within a specific range or increase the system range with respect to a specific data transmission rate, the MIMO technology is considered as a next generation mobile communication technology that can be broadly used in mobile communication terminals and relay stations. In addition, this technology is being highly recognized as a promising next generation technology that can overcome the problem of limited transmission amount in the current mobile communication.

Figure 3:
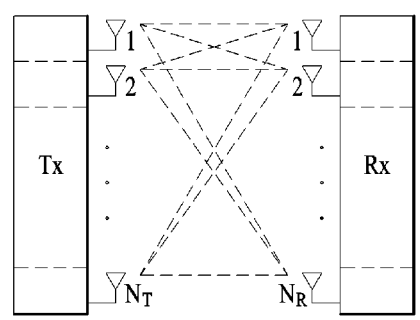
FIG. 3 is a diagram illustrating a structure of a general multi-input multi-output (MIMO) communication system.
Figure 3:
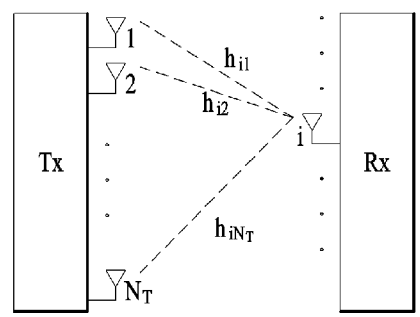

FIG. 3(a) is a diagram illustrating a configuration of a general MIMO communication system. As shown in FIG. 3(a), if the number of Tx antennas is increased to $N_T$ and the number of Rx antennas is increased to $N_R$, a theoretical channel transmission capacity is increased in proportion to the number of antennas, unlike the case where a transmitter or receiver uses several antennas. Accordingly, it is possible to remarkably improve a transmission rate and frequency efficiency. As the channel transmission capacity is increased, the transfer rate may also be theoretically increased by a product of a maximum transfer rate $R_0$ upon utilization of a single antenna and a rate increase ratio $R_i$ shown in Equation 3 below.

$$R_i = \min(N_T, N_R) \quad \text{[Equation 3]}$$

For instance, assuming that a MIMO communication system uses 4 Tx antennas and 4 Rx antennas, the MIMO system can theoretically acquire a high transfer rate which is four times higher than that of a single antenna system. After this theoretical capacity increase of the MIMO system has been proved in the middle of 90's, many ongoing efforts are made to various techniques to substantially improve a data transmission rate. Some of the above technologies have been reflected in a variety of wireless communication standards, for example, third-generation mobile communication or next-generation wireless LAN, etc.

The trends for the MIMO relevant studies are as follows. First, many ongoing efforts are made in various aspects to develop and research information theory study relevant to MIMO communication capacity calculations in various channel configurations and multiple access environments, radio channel measurement and model derivation study for MIMO systems, spatiotemporal signal processing technique study for transmission reliability enhancement and transmission rate improvement, etc.

Communication in the MIMO system will be described in detail through mathematical modeling. It is assumed that there are $N_T$ Tx antennas and $N_R$ Rx antennas as illustrated in FIG. 3(a). Since up to $N_T$ pieces of information can be transmitted through the $N_T$ Tx antennas, a transmission signal can be expressed as a vector in Equation 4.

$$S = [S_1, S_2, \ldots, S_{N_T}]^T \quad \text{[Equation 4]}$$

Meanwhile, a different transmit power may be applied to each piece of transmission information, $S_1, S_2, \ldots, S_{N_T}$. If transmit powers are set to $P_1, P_2, \ldots, P_{N_T}$, respectively, the transmission information with adjusted transmit powers can be represented as a vector in Equation 5.

$$\hat{S} = [\hat{S}_1, \hat{S}_2, \ldots, \hat{S}_{N_T}]^T = [P s_1, P s_2, \ldots, P s_{N_T}]^T \quad \text{[Equation 5]}$$

In addition, $\hat{S}$ can be represented as Equation 6 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 6]}$$

Assuming a case of configuring $N_T$ transmitted signals $x_1, x_2, \ldots, x_{N_T}$, which will be actually transmitted, by applying a weight matrix W to the information vector $\hat{s}$ having the adjusted transmit powers, the weight matrix W serves to appropriately distribute the transmission information to each antenna according to a transport channel state. The transmitted signals, $x_1, x_2, \ldots, x_{N_T} x_1, x_2, \ldots, x_{N_T}$ can be expressed as shown in Equation 7 using a vector X. In Equation 7, $W_{ij}$ denotes a weight between an $i^{th}$ Tx antenna and $j^{th}$ information and W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{12} & w_{12} & \ldots & w_{2N_T} \\ \vdots & & \ddots & \\ w_{i2} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 7]}$$

$$W\hat{s} = WPs$$

If there are $N_R$ Rx antennas, signals $y_1, y_2, \ldots, y_{N_R}$ received at the antennas can be expressed as a vector in Equation 8.

$$y = [y_1, y_2, \ldots, y_{N_R}]^T \quad \text{[Equation 8]}$$

When channel modeling is performed in the MIMO communication system, channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

The channels can be expressed in the form of a vector or a matrix by combining the channels together. Hereinafter, the vector form is described. FIG. 3(b) shows the channels from the $N_T$ Tx antennas to the Rx antenna i The channels from the $N_T$ Tx antennas to the Rx antenna i shown in FIG. 3(b) can be expressed as follows.

$$h_i^T = [h_{i1}, h_{i2}, \ldots, h_{iN_T}] \quad \text{[Equation 9]}$$

Accordingly, all channels from the $N_T$ Tx antennas to the $N_R$ Rx antennas can be expressed as shown in Equation 10 using the matrix form in Equation 9.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 10]}$$

Since an AWGN (Additive White Gaussian Noise) is added to the actual channels after a channel matrix H, the AWGN $n_1, n_2, \ldots, n_{N_R}$ respectively added to the $N_R$ Rx antennas can be expressed as a vector shown in Equation 11.

$$n=[n_1, n_2, \ldots, n_{N_R}]^T \quad \text{[Equation 11]}$$

In addition, received signals obtained by using the above Equations can be expressed as shown in Equation 12.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 12]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix. In general, the rank of the matrix is defined by the smaller of the number of rows and the number of columns, which are independent from each other. Accordingly, the rank of the matrix is not greater than the number of rows or columns. The rank of the channel matrix H can be expressed as shown in Equation 13 below.

$$\text{rank}(H) \leq \min(N_T, N_R) \quad \text{[Equation 13]}$$

MIMO transmission and reception schemes used for operating the MIMO system may include FSTD (frequency switched transmit diversity), SFBC (Space Frequency Block Code), STBC (Space Time Block Code), CDD (Cyclic Delay Diversity), TSTD (time switched transmit diversity) and the like. In a rank 2 or higher, SM (Spatial Multiplexing), GCDD (Generalized Cyclic Delay Diversity), S-VAP (Selective Virtual Antenna Permutation) and the like can be used.

The FSTD corresponds to a scheme of obtaining a diversity gain by assigning a subcarrier of a different frequency to a signal transmitted by each of multiple antennas. The SFBC corresponds to a scheme capable of securing both a diversity gain in a corresponding dimension and a multi-user scheduling gain by efficiently applying selectivity in a spatial domain and a frequency domain. The STBC corresponds to a scheme of applying selectivity in a spatial domain and a time domain. The CDD corresponds to a scheme of obtaining a diversity gain using path delay between Tx antennas. The TSTD corresponds to a scheme of distinguishing signals transmitted by multiple antennas from each other on the basis of time. The spatial multiplexing (SM) corresponds to a scheme of increasing a transfer rate by transmitting a different data according to an antenna. The GCDD corresponds to a scheme of applying selectivity in a time domain and a frequency domain. The S-VAP corresponds to a scheme of using a single precoding matrix. The S-VAP can be classified into an MCW (multi codeword) S-VAP for mixing multiple codewords between antennas in spatial diversity or spatial multiplexing and an SCW (single codeword) S-VAP for using a single codeword.

Among the aforementioned MIMO transmission schemes, the STBC scheme corresponds to a scheme of obtaining time diversity in a manner that an identical data symbol is repeated in a time domain to support orthogonality. Similarly, the SFBC scheme corresponds to a scheme of obtaining frequency diversity in a manner that an identical data symbol is repeated in a frequency domain to support orthogonality. Examples of a time block code used for the STBC and a frequency block code used for the SFBC can be represented as Equation 14 and Equation 15, respectively. Equation 14 indicates a block code in case of 2 Tx antennas and Equation 15 indicates a block code in case of 4 Tx antennas.

$$\frac{1}{\sqrt{2}} \begin{pmatrix} S_1 & S_2 \\ -S_2^* & S_1^* \end{pmatrix} \quad \text{[Equation 14]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 15]}$$

In Equation 14 and Equation 15, Si (i=1, 2, 3, 4) corresponds to a modulated data symbol. In addition, in Equation 14 and Equation 15, a row of a matrix corresponds to an antenna port and a column of the matrix corresponds to time (STBC) or frequency (SFBC).

Figure 4:
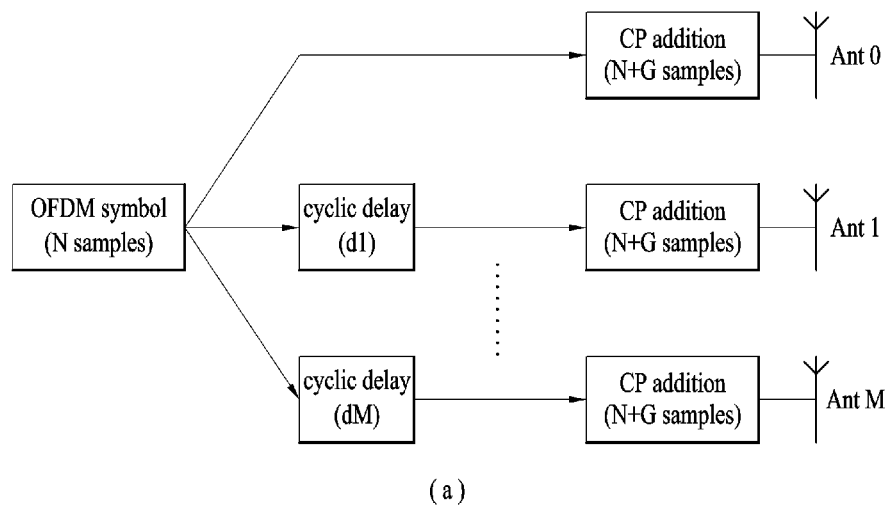
FIG. 4 is a diagram illustrating a general cyclic delay diversity (CDD) structure in a MIMO system.
Figure 4:
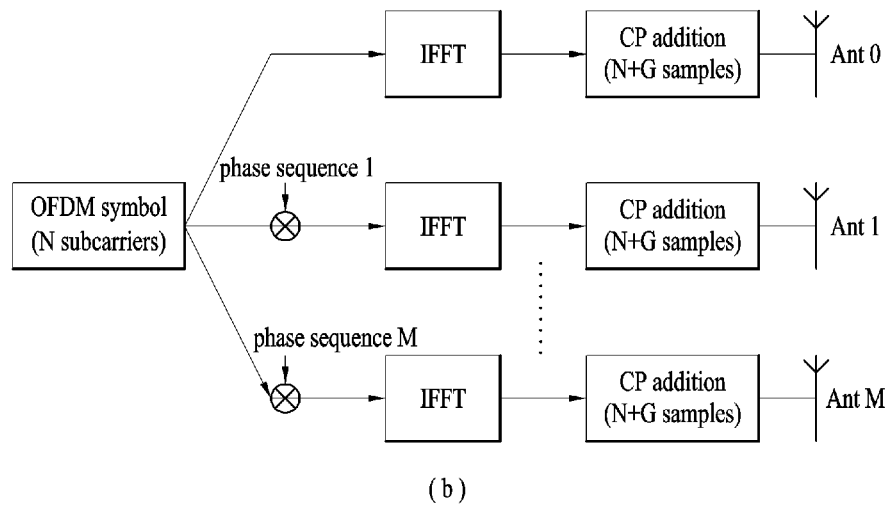

Meanwhile, among the aforementioned MIMO transmission schemes, the CDD scheme corresponds to a scheme of increasing a frequency diversity by increasing delay propagation intentionally. FIG. 4 shows an example of a general CDD structure in a multi-antenna system. Specifically, FIG. 4(a) shows a scheme of applying cyclic delay in a time domain. The CDD scheme of applying the cyclic delay in FIG. 4(a) can also be implemented by applying phase-shift diversity as shown in FIG. 4(b).

Codebook-Based Precoding Scheme

In order to support MIMO transmission, it is possible to apply a precoding configured to appropriately distribute transmission information to each of multiple antennas according to a channel state. According to the codebook-based precoding scheme, a transmitting end and a receiving end determine a set of precoding matrixes in advance, the receiving end (e.g., UE) measures channel information from the transmitting end (e.g., eNB) and provides feedback on a most suitable precoding matrix (i.e., precoding matrix index (PMI)) to the transmitting end, and the transmitting end applies an appropriate precoding to signal transmission based on the PMI.

Since the codebook-based precoding scheme is a scheme of selecting an appropriate precoding matrix from the predetermined set of precoding matrixes, an optimized precoding is not always applied but feedback overhead can be reduced compared to a case of explicitly providing feedback on precoding information optimized for actual channel information.

Figure 5:
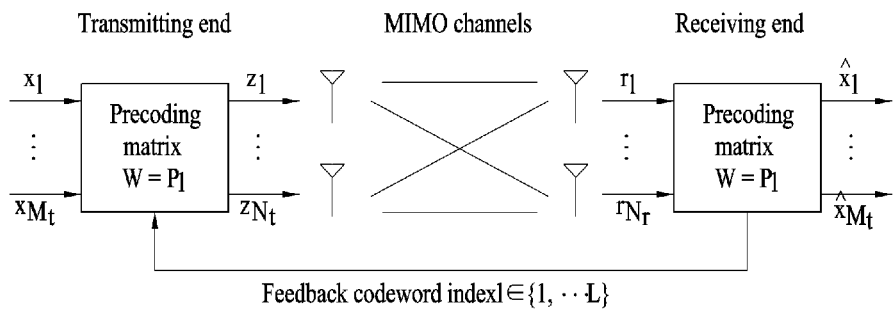
FIG. 5 is a diagram for explaining a basic concept of codebook-based precoding.

FIG. 5 is a diagram for explaining a basic concept of a codebook-based precoding.

When a codebook-based precoding scheme is applied, a transmitting end and a receiving end share codebook information including the prescribed number of precoding matrixes, which are predetermined according to a transmission rank, the number of antennas, and the like. That is, when feedback information is finite, the codebook-based precoding scheme can be used. The receiving end measures a channel state through a received signal and may provide feedback on information on the finite number of preferred precoding matrixes (i.e., an index of a corresponding precoding matrix) to the transmitting end based on the aforementioned codebook information. For instance, the receiving end measures a received signal using an ML (maximum likelihood) scheme or an MMSE (minimum mean square error) scheme and may select an optimized precoding matrix. Although FIG. 5 shows a case that the receiving end transmits precoding matrix information to the transmitting end according to a codeword, the present invention is not limited thereto.

Having received the feedback information from the receiving end, the transmitting end can select a specific precoding matrix from a codebook based on the received information. The transmitting end, which has selected the precoding matrix, performs precoding by multiplying the number of layer signals corresponding to a transmission rank by the selected precoding matrix and may transmit a transmission signal on which the precoding is performed through a plurality of antennas. In a precoding matrix, the number of rows is identical to the number of antennas and the number of columns is identical to a rank value. Since the rank value is identical to the number of layers, the number of columns is identical to the number of layers. For instance, if the number of Tx antennas corresponds to 4 and the number of transmission layers corresponds to 2, a precoding matrix can be configured by a 4×2 matrix. Information transmitted through each layer can be mapped to each antenna through the precoding matrix.

Having received the signal, which is transmitted from the transmitting end by being pre-coded, the receiving end can restore the received signal by performing reverse processing on the precoding. In general, since a precoding matrix satisfies a unitary matrix (U) condition such as $U*U^H=I$, the reverse processing performed on the precoding can be performed using a scheme of multiplying Hermit matrix $(P^H)$ of a precoding matrix (P) used by the transmitting end for the precoding by the received signal.

For instance, Table 1 below shows a codebook used for downlink transmission through 2 Tx antennas in the 3GPP LTE release-8/9 and Table 2 below shows a codebook used for downlink transmission through 4 Tx antennas in the 3GPP LTE release-8/9.

TABLE 1

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ 1\ 1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ 1\ 1\ 1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, $W_n^{\{s\}}$ can be obtained from a set $\{s\}$ configured by the equation of $W_n=I-2u_nu_n^H/u_n^Hu_n$. In this case, I indicates a 4×4 single matrix and $u_n$ is a value given in Table 2.

As shown in Table 1, in case of a codebook for 2 Tx antennas, it may have a total of 7 precoding vectors/matrixes. In this case, since a single matrix is used for an open-loop system, a total of 6 precoding vectors/matrixes are used for a close-loop system. In addition, in case of a codebook for 4 Tx antennas shown in Table 2, it may have a total of 64 precoding vectors/matrixes.

The aforementioned codebook has a common property such as a CM (constant modulus) property, a nested property, a constrained alphabet property, and the like. The CM property means that each element of all precoding matrixes in a codebook does not include '0' and has the same size. The nested property means that a precoding matrix of a lower rank is configured by a subset of a specific column of a precoding matrix of a higher rank. The constrained alphabet property means that an alphabet of each element of all precoding matrixes in a codebook is configured by $$\left\{\pm 1, \pm j, \pm \frac{(1+j)}{\sqrt{2}}, \pm \frac{(-1+j)}{\sqrt{2}}\right\}.$$

Feedback Channel Structure

Basically, since an eNB is unable to know information on a downlink channel in an FDD (frequency division duplex) system, the eNB uses channel information fed back by a UE for downlink transmission. In the legacy 3GPP LTE release-8/9 system, a UE can feedback downlink channel information through a PUCCH or PUSCH. In the case of the PUCCH, the PUCCH periodically feedbacks channel information. In the case of the PUSCH, the PUSCH aperiodically feedbacks channel information according to a request of the eNB. In addition, channel information can be fed back in response to the whole of assigned frequency bands (i.e., wideband (WB)) or a specific number of RBs (i.e., subband (SB)).

Extended Antenna Configuration

Figure 6:
FIG. 6 illustrates an example of configuring 8 Tx antennas.
Figure 6:
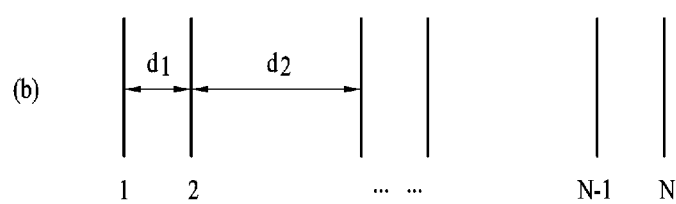
Figure 6:
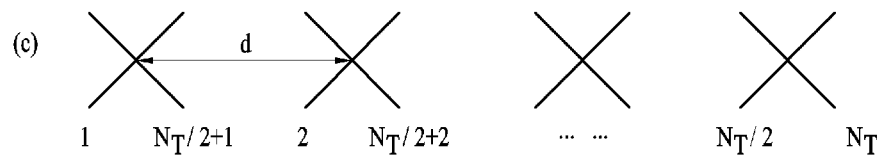

FIG. 6 is a diagram for examples of configuring 8 Tx antennas.

FIG. 6 (a) shows a case that N antennas configure an independent channel without grouping. In general, this case is referred to as an ULA (uniform linear array). If a plurality of antennas are deployed apart from each other, a space of a transmitter and/or a receiver may not be enough to configure channels independent from each other.

FIG. 6(b) shows an antenna configuration (paired ULA) according a ULA scheme where two antennas make a pair. In this case, an associated channel may exist between the two antennas making a pair and an independent channel may exist between antennas belonging to a different pair.

Meanwhile, unlike the legacy 3GPP LTE release-8/9 using 4 Tx antennas in downlink, the 3GPP LTE release-10 system may use 8 Tx antennas in downlink. To apply the extended antennas configuration, it is necessary to install many antennas in an insufficient space. Thus, the ULA antenna configurations shown in FIGS. 6(a) and (b) may not be appropriate for the extended configuration. Therefore, as shown in FIG. 6(c), it may consider applying a dual-pole (or cross-pole) antenna configuration. If Tx antennas are configured using the dual-pole (or cross-pole) antenna configuration, even though a distance d between antennas is relatively short, it is able to transmit data of high throughput by lowering antenna correlation.

Codebook Structures

As described above, if a predefined codebook is shared between transmitting and receiving ends, it is possible to reduce overhead of the receiving end resulted from making a feedback on precoding information to be used for MIMO transmission of the transmitting end. Hence, the precoding can be efficiently applied.

As an example of configuring a predetermined codebook, a precoder matrix may be configured using a DFT (Discrete Fourier Transform) matrix or a Walsh matrix. Alternatively, various forms of precoders may be implemented by combining the precoder matrix with a phase shift matrix or a phase shift diversity matrix.

If co-polarization antennas are used, a DFT-based codebook can guarantee good performance. In addition, when a DFT matrix-based codebook is configured, an n×n DFT matrix can be defined as Equation 16 below.

$$DFTn: \ D_n(k, \ell) = \frac{1}{\sqrt{n}}\exp(-j2\pi k\ell/n), \quad \text{[Equation 16]}$$

$$k, \ell = 0, 1, \ldots, n-1$$

The DFT matrix shown in Equation 16 exists as a single matrix with respect to a specific size n. Thus, to define various precoding matrixes and appropriately use the various precoding matrixes depending on a situation, it may consider additionally configuring and using a rotated version of a DFTn matrix. Equation 17 below shows an example of a rotated DFTn matrix.

$$\text{rotated } DFTn: \ D_n^{(G,g)}(k, \ell) = \frac{1}{\sqrt{n}}\exp(-j2\pi k(\ell + g/G)/n), \quad \text{[Equation 17]}$$

$$k, \ell = 0, 1, \ldots, n-1, \ g = 0, 1, \ldots, G.$$

If a DFT matrix is configured as shown in Equation 17, it is possible to generate G rotated DFTn matrixes and the generated matrixes satisfy properties of the DFT matrix.

Hereinafter, a householder-based codebook structure is explained. The householder-based codebook structure means a codebook configured by a householder matrix. The householder matrix is a matrix used for householder transform. The householder transform is a sort of linear transformations and can be used to perform QR decomposition. The QR decomposition is to decompose a matrix into an orthogonal matrix (Q) and an upper triangular matrix (R). The upper triangular matrix means a square matrix where all components below a main diagonal line component are 0. For example, a 4×4 householder matrix can be expressed as shown in Equation 18 below.

$$M_1 = I_4 - 2u_0 u_1^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix}, \quad \text{[Equation 18]}$$

$$u_0^T[1 \ -1 \ -1 \ -1]$$

It is possible to generate a 4×4 unitary matrix having the CM property by the householder transform. Similar to the codebook for 4 Tx antennas shown in Table 2, an n×n precoding matrix can be generated using the householder transform and it is possible to configure the precoding matrix to be used for rank transmission less than n using a column subset of the generated precoding matrix.

Codebook for 8 Tx Antennas

According to the 3GPP LTE release-10 system where an extended antenna configuration (e.g., 8 Tx antennas) is used, a feedback scheme used in the legacy 3GPP LTE release-8/9 system may be applied by extending the feedback scheme. For example, it is possible to feedback channel state information (CSI) such as an RI (rank indicator), a PMI (precoding matrix index), CQI (channel quality information) and the like. Hereinafter, a description will be given of a method for designing a dual precoder-based feedback codebook capable of being used in a system supporting an extended antenna configuration. To indicate a precoder of the dual precoder-based feedback codebook, which will be used for MIMO transmission at a transmitting end, a receiving end can transmit a precoding matrix index to the transmitting end. A precoding matrix can be indicated by a combination of two different PMIs. That is, if the receiving end feedbacks the two different PMIs (i.e., a first PMI and a second PMI) to the transmitting end, the transmitting end may determine a precoding matrix indicated by the first and the second PMI then apply the determined precoding matrix to the MIMO transmission.

In designing the dual precoder-based feedback codebook, it may consider MIMO transmission performed by 8 Tx antennas, whether single user-MIMO (SU-MIMO) or multiple user-MIMO (MU-MIMO) is supported, suitability of various antenna configurations, a codebook design standard, a codebook size, etc.

In case a codebook is applied to MIMO transmission performed by the 8 Tx antennas, if the codebook is greater than rank 2, SU-MIMO is supported only. If the codebook is equal to or less than the rank 2, a feedback codebook should be designed such that it is optimized for both the SU-MIMO and the MU-MIMO and appropriate for various antenna configurations.

Regarding the MU-MIMO, it is preferred to make UEs participating in the MU-MIMO be separated from each other in a correlation domain. Hence, it is necessary to design a codebook for the MU-MIMO to be properly operated on a channel of high correlation. Since DFT vectors provide good performance on the channel of high correlation, it may consider including a DFT vector in a set of codebooks up to rank-2. In addition, in high scattering propagation environment (e.g., indoor environment where there are many reflected waves) capable of generating many spatial channels, a SU-MIMO operation may be more suitable rather than a MIMO transmission scheme. Hence, a codebook for a rank greater than rank-2 needs to be designed to have good performance in identifying multiple layers.

When designing a precoder for MIMO transmission, it is preferred to make a precoder structure have good performance in response to various antenna configurations (low correlation, high correlation, cross-polarization, and the like). When 8 Tx antennas are arranged, it is possible to configure a cross-polarization array having $4\lambda$ antenna space as a low-correlation antenna configuration, a ULA having $0.5\lambda$ antenna space as a high-correlation antenna configuration, or a cross-polarization array having $0.5\lambda$ antenna space as a cross-polarization antenna configuration. In addition, a DFT-based codebook structure can provide good performance in response to the high-correlation antenna configuration.

Meanwhile, block diagonal matrixes may be more suitable for the cross-polarization antenna configuration. Thus, if a diagonal matrix is applied to a codebook for 8 Tx antennas, it is possible to configure a codebook capable of providing goof performance with respect to all antenna configurations.

As described above, the codebook design standard needs to satisfy a unitary codebook, a CM property, a constrained alphabet property, an appropriate codebook size, a nested property and the like. This standard has been reflected in the 3GPP LTE release-8/9 codebook design. In addition, it may be considered that the codebook design standard is reflected in the 3GPP LTE release-10 codebook design supporting an extended antenna configuration as well.

Regarding a codebook size, it is necessary to increase the codebook size to sufficiently support advantages obtained by using the 8 Tx antennas. To obtain a sufficient precoding gain from the 8 Tx antennas in a low correlation environment, a large size of a codebook (e.g., a codebook with a size greater than 4 bits with respect to rank 1 and rank 2) may be required. In addition, a 4-bits size of a codebook may be enough to obtain a precoding gain in a high correlation environment. However, to achieve a multiplexing gain in the MU-MIMO, the codebook size for the rank 1 and the rank 2 can be increased.

Based on the above discussion, a method for designing a reference signal when a cyclic delay diversity (CDD) is applied to a precoding is described in the present invention. Particularly, the present invention can be efficiently applied when a transmitter uses massive antennas based on an active antenna system (hereinafter abbreviated as AAS). As a representative example, the present invention can be utilized for downlink communication between an eNB and a UE in a cellular network.

In a wireless communication system after LTE Rel-12, the introduction of the antenna system utilizing the AAS has been discussed. Since each antenna of the AAS corresponds to an active antenna including an active circuit, the AAS can efficiently adapt to a wireless communication environment by changing an antenna pattern. Thus, in the AAS, interference can be reduced and efficient beamforming can also be performed, whereby overall system performance can be improved.

Moreover, if the AAS is established in two dimensions (i.e., 2D-AAS), it is possible to adjust a beam direction at a main lobe of each antenna not only in the horizontal direction but also in the vertical direction in terms of the antenna pattern. Thus, the beam adaptation can be performed more efficiently in three dimensions. In addition, it is possible to actively change a transmitted beam depending on a location of a UE based on the above beam adaptation.

Figure 7:
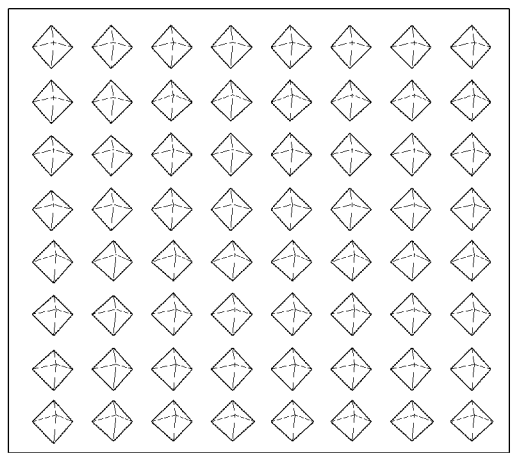
FIG. 7 illustrates an active antenna system (AAS).

FIG. 7 is a reference diagram for explaining the 2D-AAS where the present invention can be applied. The 2D-AAS shown in FIG. 7, i.e., the antenna system having multiple antennas can be implemented by installing antennas in the vertical and horizontal directions Hereinafter, a method for designing/configuring a reference signal when the AAS in FIG. 7 is introduced is described in detail.

First, a large delay CDD (hereinafter referred to as LD-CDD) defined in the current LTE system will be described to provide a further understanding of the present invention. According to the current LTE system, the LD-CDD can be defined as shown in Equation 19.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad \text{[Equation 19]}$$

In Equation 19, $x(i)=[x^{(0)}(i) \ldots x^{(v-1)}(i)]^T$ indicates a data symbol vector to which the precoding is not applied, and $y(i)=[y^{(0)}(i) \ldots y^{(P-1)}(i)]^T$ indicates a transmission vector to which the precoding is added. In addition, v means the number of transmission data layers and P means the number of independent antenna ports. Moreover, W(i) in Equation 19 indicates a precoding matrix for adjusting channels. That is, an appropriate codeword may be selected from a codebook depending on channel variation according to Equation 19. However, in the current LTE system, the codeword is not selected depending on a channel. That is, W(i) used in the LTE system can be given as shown in Equation 20.

$$\begin{cases} W(i) = C_1 & \text{for 2 antenna ports} \\ W(i) = C_k, k = \left(\left\lfloor \frac{1}{v} \right\rfloor \bmod 4\right) + & \text{for 4 antenna ports} \\ 1 \in \{1, 2, 3, 4\} \end{cases}$$ [Equation 20]

In Equation 20, $C_k$ means a codeword and it is configured such that W(i) corresponds to a channel varying according to a fixed value or a certain pattern.

Meanwhile, in equation 19, a diagonal matrix, D(i) and a unitary matrix, U are defined to equally distribute layers depending on the number of the layers (i.e., rank) in a virtual antenna domain.

By doing so, all individual layers may have the same channel quality. That is, since the channel qualities of the layers are equalized, signal overhead can be reduced. For example, if a linear minimum mean square error (MMSE) is applied to a receiving end, only one CQI can be fed back and separate HARQ retransmission may not be required for different layers, whereby signaling overhead related to DL control signals can be reduced. D(i) and U used in the current LTE system can be summarized as shown in Table 3.

TABLE 3

| Number of layers v | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{j12\pi/4} & e^{j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{j6\pi i/4} \end{bmatrix}$ |

Details of the LD-CDD system will be described. In Equation 19, W(i) may correspond to a channel-related precoding matrix, U may be generalized as a unitary matrix, and D(i) may be generalized as a diagonal matrix where diagonal terms have phase differences as shown in Equation 21.

$$D(i) = \begin{bmatrix} 1 & 0 & \cdots & 0 \\ 0 & e^{j\theta_{1,i}} & \cdots & 0 \\ \vdots & \vdots & \ddots & 0 \\ 0 & 0 & 0 & e^{j\theta_{v-1,i}} \end{bmatrix}$$ [Equation 21]

In this case, D(i) is configured to perform a phase shift on each frequency. When the generalized W(i) and D(i) are applied to Equation 19, it can be interpreted as that beamforming varying depending on frequencies is performed on all layers by D(i) and U. Thus, the individual layers may have frequency diversities and be equalized. For a further understanding, a covariance matrix of the transmission vector, y can be defined as shown in Equation 22.

$$R_{yy}^{(i)} = E[y(i)(y(i))^H] = W(i)D(i)UU^H(D(i))^H(W(i))^H = W(i)(W(i))^H$$ [Equation 22]

It can be seen from Equation 22 that if W(i) is assumed to be a precoding matrix for increasing a channel gain based on a maximum eigenvalue of a channel, D(i) and U may be used to equalize the channel qualities of all the layers while maintaining the increased channel gain. In addition, in Equation 22, D(i) and U does not cause a change in the covariance matrix of the transmission vector.

Based on the above discussion, the present invention describes a case in which when the 2D-AAS is established in an eNB, not only horizontal antennas in the conventional wireless system but also vertical antennas are installed together. That is, in the conventional CDD scheme, a diversity gain is obtained by changing horizontal beam directions, whereas in the 2D-AAS based eNB, not only the horizontal beam directions but also vertical beam directions are changed to obtain a greater diversity gain.

Therefore, a CDD scheme for changing vertical beam directions as well as horizontal beam directions has been recently discussed. However, the CDD scheme for changing the vertical beam directions as well as the horizontal beam directions may cause the following problem. According to the CDD scheme of the current LTE communication system, the CDD precoding as shown in Equation 19 is informed to both an eNB and a UE in advance. In addition, the eNB may inform the UE of channels from horizontal antenna ports to the UE through CRSs for the horizontal antenna ports and the UE may be aware of final channels by applying the CDD precoding to the channels informed through the CRSs. In this case, assuming that an eNB where the 2D-AAS is established uses the CDD precoding while changing even the vertical beam directions according to the present invention, the number of required CRS ports may be increased to be equal to the number of total antenna ports. However, the eNB cannot inform the UE of more than four antenna ports using the CRS ports each of which corresponds to a 4-port.

First Method

To solve the above-mentioned problem, the present invention proposes that when the CDD precoding is applied to more than $N_{CRS}$ antenna ports, an eNB uses DMRS ports for antenna ports out of the range of $N_{CRS}$ for channel measurement. In this case, $N_{CRS}$ is the number of CRS ports, which are currently configured by the eNB. In the case of the $N_{CRS}$ antenna ports, a UE perform the channel measurement using the CRS ports and in the case of the remaining antenna ports, the UE perform the channel measurement using the DMRS ports (In this case, the remaining antenna ports mean antenna ports except antenna ports used for transmitting CRSs among antenna ports required to restore entire channels).

The UE may apply the CDD precoding to the channels measured using the CRS ports and the DMRS ports and then recognize final channels. The antenna ports are transmitted as the CRS ports and the antenna ports are transmitted as the DMRS ports among antenna ports of the eNB may be known to both of the eNB and the UE in advance. Alternatively, the eNB can semi-statically inform the UE of the above information through RRC signaling. The first method may be implemented as at least one of the following methods 1-A and 1-B.

1-A: When an eNB with N antenna ports uses the CDD precoding, the eNB transmits CRSs for $N_{CRS}$ antenna ports and DMRSs for the remaining (N–$N_{CRS}$) antenna ports for the channel measurement.

Thereafter, a UE measures channels for the $N_{CRS}$ antenna ports using the CRS ports and channels for the remaining (N–$N_{CRS}$) antenna ports using the DMRS ports. In addition, the UE may obtain final channels by applying the CDD precoding to the above measured channels.

The antenna ports are transmitted as the CRS ports and the antenna ports are transmitted as the DMRS ports among the antenna ports of the eNB may be previously defined between the eNB and the UE. Alternatively, the eNB can semi-statically inform the UE of the above antenna ports through RRC signaling.

1-B: When an eNB with $N_H$ horizontal antenna ports and $N_V$ vertical antenna ports uses the CDD precoding, the eNB transmits CRSs for $N_{CRS}$ horizontal antenna ports and DMRSs for the remaining (N–$N_{CRS}$) antenna ports for the channel measurement.

Thus, a UE measures channels for the $N_{CRS}$ horizontal antenna ports using the CRS ports and channels for the remaining ($N_H$–$N_{CRS}$) antenna ports using the DMRS ports. In addition, the UE measures channels for the $N_V$ vertical antenna ports using the DMRS ports.

Thereafter, the UE performs Kronecker product of vertical channels and horizontal channels, which are measured for each Rx antenna, to measure (estimate) entire channels for each Rx antenna. (For example, if horizontal antenna channels for each Rx antenna are $H_H$ and vertical antenna channels for each Rx antenna are $H_V$, entire channels for each Rx antenna can be defined as $H_H \otimes H_V$ or $H_V \otimes H_H$.) In addition, the UE may obtain final channels by applying the CDD precoding to the above channels.

Moreover, the antenna ports are transmitted as the CRS ports and the antenna ports are transmitted as the DMRS ports among the antenna ports of the eNB may be previously defined between the eNB and the UE. Alternatively, the eNB can semi-statically inform the UE of the above antenna ports through RRC signaling.

Further, when the above-mentioned first method (e.g., method 1-A or 1-B) is applied, fallback mode may be used in transmission mode. Alternatively, instead of the fallback mode, 1 bit of DCI may be configured such that the use of the first method (e.g., method 1-A or 1-B) is informed the UE through the DCI.

Hereinafter, a description will be given of a particular example of the method 1-A. First, assuming that there is an antenna domain having four horizontal antenna ports and three vertical antenna ports, the number of total antenna ports becomes twelve (12=4*3). In addition, it is assumed that an eNB uses a 4-port CRS.

In this case, the eNB transmits CRSs for the four horizontal antenna ports, which located at the bottom of the antenna domain, and transmits DMRSs for the remaining eight antenna ports. A UE measures channels for the individual antenna ports using the received CRSs and DMRSs and then estimates the channels for the twelve antenna ports. Thereafter, the UE applies the CDD precoding to obtain final channels.

Further, a particular example of the method 1-B is explained. Assuming that there is an antenna domain having four horizontal antenna ports and eight vertical antenna ports, the number of total antenna ports becomes thirty two (32=4*8). In this case, an eNB transmits CRSs for the four horizontal antenna ports, which are located at the bottom of the antenna domain, and transmits DMRSs for the eight vertical antenna ports, which are located at the left of the antenna domain. A UE measures channels for the horizontal and vertical antenna ports using the received CRSs and DMRSs. Thereafter, the UE estimates entire channels for each Rx antenna by calculating $H_H \otimes H_V$ or $H_V \otimes H_H$ and then applies the CDD precoding to obtain final channels.

However, the methods 1-A and 1-B may cause the following problems. In the case of the method 1-A, as the number of the total antennas increases, the number of the DMRSs to be transmitted should also increase. In the case of the method 1-B, when a result of the Kronecker product is inaccurate, the channel measurement (estimation) may also be inaccurate.

To overcome the above problems, a second method, which will be described herein, can be applied together with the first method.

Second Method

According to the second method, total antennas can be grouped into $N_g$ groups and each of the groups can be mapped to a corresponding DMRS port.

Thus, an eNB may inform a UE of channels for $N_g$ antenna ports using $N_g$ DMRS ports. By applying the CDD precoding to the channels for the $N_g$ antenna ports, the UE may recognize final channels. In this case, a precoding for each group may be differently set in a unit of a resource block. The second method may be implemented as at least one of the following methods 2-A and 2-D.

2-A: DMRS ports may be configured for antennas in each group using a precoding fed back by a UE. In this case, the precoding for each group may be differently set in the unit of the resource block.

2-B: DMRS ports may be configured for antennas in each group using a predefined precoding or a precoding defined by an eNB in a random manner. In this case, the precoding for each group may be differently set in the unit of the resource block.

2-C: In case of $N_g \leq 4$, the CDD precoding shown in Equation 19, which is used in the current LTE system, may be applied to g DMRS ports. The UE applies the CDD precoding shown in Equation 19 to channels obtained by using the $N_g$ DMRS ports to recognize final channels.

2-D: In case of $N_g > 4$, the $N_g$ DMRS ports are grouped into $N_G$ groups. The CDD precoding of the current LTE system shown in Equation 19 may be applied to each group. For each group, the same CDD precoding may be applied to the $N_G$ groups. However, in some cases, different CDD precodings may be applied. The UE applies the CDD precoding shown in Equation 19 to the channels obtained by using the $N_g$ DMRS ports in each of the $N_G$ groups to recognize the final channels.

Further, when the above-mentioned second method (e.g., method 2-A, 2-B, 2-C or 2-D) is applied, fallback mode may be used in transmission mode. Alternatively, instead of the fallback mode, 1 bit of DCI may be configured such that the use of the second method (e.g., method 2-A, 2-B, 2-C or 2-D) is informed the UE through the DCI.

As a particular example of the second method, an antenna domain having four horizontal antenna ports and eight vertical antenna ports is described. The number of total antenna ports becomes thirty two (32=4*8). In this case, an eNB forms four groups by grouping eight vertical antenna ports into a group. For each group, four DMRS ports may be created by applying a precoding fed back by a UE as mentioned in the method 2-A. Alternatively, the four DMRS ports may be created by applying a predefined precoding or a precoding defined by the eNB in a random manner as described in the method 2-B. As mentioned in the method 2-C, the CDD precoding in Equation 19 may be applied to the four DMRS ports and then transmission may be transmitted. A UE measures channels based on RSs transmitted using the four DMRS ports. Thereafter, the UE recognizes final channels by applying the CDD precoding in Equation 19 to the measured channels.

If a DMRS is used for the CDD precoding as mentioned in the present invention (e.g., first and second methods), an eNB needs to inform a UE of the number of layers and the number of ports. According to the current LTE communication system, a port number of the DMRS matches the number of the layers. Thus, in the LTE system, the eNB informs the UE of the DMRS port number through DCI to allow the UE to know the number of the layers.

Third Method

When the present invention is applied, a DMRS port number may not match the number of layers. Thus, an eNB needs to inform both of them separately. The third method may be implemented as at least one of the following methods 3-A to 3-C.

3-A: The DMRS port number for the CDD precoding may be semi-statically informed the UE through RRC signaling. Alternatively, it may be informed the UE through DCI. In addition, the number of the layers is informed the UE through the DCI.

In this case, to inform the DMRS port number, a set including all available port numbers may be determined and then a specific one selected from the set may be informed. included. Thus, if the CDD precoding is used, a combination of a specific DMRS port number for the CDD precoding and the number of layers may be informed through the filed for informing the rank index for the beamforming in the DCI format.

3-C: If the DMRS for the CDD precoding is used, $n_{SCID}$ can be set to 0 to maintain mutual orthogonality as much as possible. That is, an initial value of a pseudo-random sequence associated with the DMRS of the conventional LTE system can be determined as shown in Equation 23. In Equation 23, $n_{SCID}$ can be set to 0.

$$c_{init}=(\lfloor n_s/2 \rfloor+1)\cdot(2n_{ID}^{(nSCID)}+1)\cdot 2^{16}+n_{SCID} \quad [\text{Equation 23}]$$

Further, according to the present invention, if the DMRS for the CDD precoding is used, i) a UE can assume that a CRS-to-PDSCH power ratio (i.e., $P_A$, $P_B$) is equal to a DMRS-to-PDSCH power ratio according to the present invention, or ii) a UE can be separately signaled a parameter associated with the DMRS-to-PDSCH power ratio. In other words, in the former case i), the UE may be configured to assume the DMRS-to-PDSCH power ratio to be equal to the CRS-to-PDSCH power ratio defined in the conventional LTE communication system. Table 4 shows the CRS-to-PDSCH power ratio defined in the conventional LTE communication system.

TABLE 4

| Number of antenna ports | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
|---|---|---|---|---|
| | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

Alternatively, the DMRS port number may be informed using a set including only port numbers in limited cases.

For example, an eNB capable of configuring a maximum of an 8-port DMRS may make a set based on two DMRSs, i.e., a 2-port DMRS and an 8-port DMRS. Thereafter, the eNB may select one of the two DMRSs using 1 bit and then use the selected DMRS.

Assuming that in each PRB pair, the 2-port DMRS is transmitted using 12 REs and the 8-port DMRS is transmitted using 24 REs, the eNB intends to use a maximum port number of a DMRS considering that resource overhead corresponds to the 12 REs and 24 REs.

In other words, considering that the 12-RE overhead occurs while the CDD precoding is performed, it is expected that compared to a 1-port DMRS, the 2-port DMRS can guarantee a greater diversity gain in terms of the same RE overhead. In addition, considering that the 24-RE overhead occurs while the CDD precoding is performed, it is expected that compared to 3-7-port DMRSs, the 8-port DMRS can guarantee a greater diversity gain in terms of the same RE overhead.

3-B: It is possible to configure a set by selectively combining DMRS port numbers for the CDD precoding with the number of the layers. In addition, the set configured according to the method 3-B may be informed through the DCI. As described above, whether the CDD precoding is used may be informed using 1 bit of the DCI.

If the CDD precoding is not used, a field for informing a rank index for beamforming in a DCI format may be Further, according to the present invention, the eNB may request the UE to transmit a CQI and an RI. In this case, the UE may be unable to calculate the CQI and the RI using the DMRS, which is transmitted only when there is data transfer. Thus, the eNB may inform the UE of a CSI-RS interconnected to the DMRS through RRC signaling to allow the UE to calculate the CQI.

In other words, the eNB informs configuration information on the CSI-RS with the same port number as the DMRS for CQI feedback. Such a CSI-RS may be used instead of the DMRS in the aforementioned methods 1 and 2. That is, the UE may calculate the RI or the CQI by considering the CDD precoding together with a combination of the CSI-RS and the CRS according to the method 1. Alternatively, the UE may calculate the RI or the CQI by considering the CDD precoding together with the CSI-RS according to the method 2.

In addition, the UE may be configured to calculate the corresponding CQI on the assumption of a transmit diversity such as SFBC (space frequency block coding). In this case, if the interconnected CSI-RS exceeds a 4-port CSI-RS (e.g., 8-port CSI-RS), it is possible to define an SFBC-related configuration having an increased port number, which can be applied to the interconnected CSI-RS. As a representative example, the conventional SFBC-related configuration associated with the 4-port or less can be extended to define the above SFBC-related configuration. Moreover, this SFBC-related configuration is not be applied to the CRS but it may be applied to i) the corresponding CSI-RS or ii) a combination of the corresponding CSI-RS and the CRS, which correspond to information interconnected to the DMRS.

Furthermore, as another embodiment for calculating the CQI, the UE may be configured to calculate and report the CQI on the assumption that rank 1 restriction is always configured instead of the transmit diversity. In this case, since rank 1 is assumed, the UE may be configured to calculate the CQI by assuming a precoding scheme predetermined based on a pattern where a PMI for the rank1 circulates in each RE. However, although the rank 1 restriction may be configured to be applied at all times, such operation may be set to be configurable through RRC signaling.

Further, the present invention can also be applied to a case where an MBSFN subframe is used. Since there is no CRS in the MBSFN subframe, it may be previously configured that the aforementioned second method (e.g., method 2-A, 2-B, 2-C, or 2-D) is applied to the MBSFN subframe. For instance, in the case of a non-MBSFN subframe, the CRS is included according to the first method (e.g., method 1-A or 1-B) and the invention is applied to an additional reference signal (e.g., DMRS). On the other hand, in the case of the MBSFN SF (subframe), the CRS is not included according to the second method and the invention is applied only to the additional reference signal (e.g., DMRS). In other words, some of the methods/embodiments proposed in the present invention can be separately applied to a specific subframe set. To this end, it may be previously defined/configured that dynamic switching between the aforementioned methods/embodiments is allowed in each subframe. Further, although the first method (e.g., method 1-A or 1-B) is used, it is pre-defined that in the case of the MBSFN subframe, all reference signals transmitted through CRS ports and DMRS ports are changed to DMRSs.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method for transmitting a reference signal for channel measurement in a multi-antenna wireless communication system and apparatus therefor are mainly described with reference to examples applied to the 3GPP LTE system, the method and apparatus can be applied to various kinds of wireless communication systems as well as the 3GPP LTE system.

What is claimed is:

1. A method for transmitting demodulation reference signals (DMRSs) by an evolved Node B (eNB) in a wireless communication system supporting multiple antennas composed of a plurality of horizontal domain antennas and a plurality of vertical domain antenna, the method comprising:
grouping total N antennas to $N_g$ grouped antennas, where N and $N_g$ are positive integers and $N>N_g>0$;
mapping each of $N_g$ grouped antennas to DMRS ports;
transmitting DMRSs to a user equipment (UE) based on the DMRS ports; and
receiving, from the UE, feedback on channel measurement information based on the DMRSs,
wherein when $N_g$ is 4 or less, a large delay cyclic delay diversity (CDD) precoding is used for the DMRS ports, and
wherein when $N_g$ is more than 4, the large delay CDD precoding is used for the $N_G$ groups configured by dividing the DMRS ports, and the same precoding is used between antennas belonging to each of the $N_G$ groups.

2. The method of claim 1, further comprising transmitting information on the DMRS to the UE through higher layer signaling.

3. The method of claim 1, wherein the large delay CCD precoding is applied based on the channel measurement information received from the UE.

4. The method of claim 1, further comprising transmitting information on a power ratio of the DMRSs to a physical downlink shared channel (PDSCH).

5. The method of claim 1, further comprising indicating channel state information reference signals (CSI-RSs) interconnected to the DMRSs.

6. An evolved Node B (eNB) for transmitting demodulation reference signals (DMRSs) in a wireless communication system supporting multiple antennas composed of a plurality of horizontal domain antennas and a plurality of vertical domain antenna, the eNB comprising:
 a transceiver; and
 a processor,
 wherein the processor is configured to:
  group total N antennas to $N_g$ grouped antennas, where N and $N_g$ are positive integers and $N > N_g > 0$,
  map each of $N_g$ grouped antennas to DMRS ports,
  control the transceiver to transmit DMRSs to a user equipment (UE) based on the DMRS ports, and
  control the transceiver to receive, from the UE, feedback on channel measurement information based on the DMRSs,
 wherein when $N_g$ is 4 or less, a large delay cyclic delay diversity (CDD) precoding is used for the DMRS ports, and
 wherein when $N_g$ is more than 4, the large delay CDD precoding is used for the $N_G$ groups configured by dividing the DMRS ports, and the same precoding is used between antennas belonging to each of the $N_G$ groups.

* * * * *